(12) United States Patent
Czosnowski et al.

(10) Patent No.: US 9,360,634 B2
(45) Date of Patent: Jun. 7, 2016

(54) STRUCTURES AND TECHNIQUES FOR ALIGNING A MULTICORE FIBER IN A FERRULE OR PRODUCTION JIG

(71) Applicant: OFS FITEL, LLC, Norcross, GA (US)

(72) Inventors: Wladyslaw Czosnowski, Duluth, GA (US); John George, Cumming, GA (US)

(73) Assignee: OFS FITEL, LLC, Nocross, GA (US)

( * ) Notice: Subject to any disclaimer, the term of this patent is extended or adjusted under 35 U.S.C. 154(b) by 0 days.

(21) Appl. No.: 14/647,205

(22) PCT Filed: Dec. 4, 2013

(86) PCT No.: PCT/US2013/073018
§ 371 (c)(1),
(2) Date: May 26, 2015

(87) PCT Pub. No.: WO2014/089159
PCT Pub. Date: Jun. 12, 2014

(65) Prior Publication Data
US 2015/0301291 A1     Oct. 22, 2015

Related U.S. Application Data

(60) Provisional application No. 61/733,531, filed on Dec. 5, 2012.

(51) Int. Cl.
*G02B 6/00*     (2006.01)
*G02B 6/36*     (2006.01)
*G02B 6/38*     (2006.01)
*G02B 6/02*     (2006.01)

(52) U.S. Cl.
CPC .......... *G02B 6/3834* (2013.01); *G02B 6/02042* (2013.01); *G02B 6/3616* (2013.01); *G02B 6/3855* (2013.01); *G02B 6/3885* (2013.01)

(58) Field of Classification Search
CPC ............................ G02B 6/3834; G02B 6/3616
USPC ...................................... 385/84, 137
See application file for complete search history.

(56) References Cited

U.S. PATENT DOCUMENTS

2011/0229086 A1*   9/2011   Bradley ............... G02B 6/3885
                                                                                                385/78

* cited by examiner

*Primary Examiner* — Jerry Blevins
(74) *Attorney, Agent, or Firm* — Jacobs & Kim LLP

(57) ABSTRACT

An alignment block for aligning a multicore fiber has a body with a front face and a rear face, and includes a capillary extending between a front opening at the first face and a rear opening at the rear face. The capillary has an inner circumference that includes an alignment surface corresponding to the multicore fiber alignment surface. The front opening is shaped to fit closely around the multicore fiber so as to prevent non-longitudinal movement of the multicore fiber relative to the alignment block body. The rear opening is shaped to fit around the multicore fiber so as to allow a selected amount of non-longitudinal movement of the multicore fiber relative to the alignment block body. The capillary provides tapered transition between the rear opening and the front opening. Movement of the multicore fiber along the capillary causes the multicore fiber alignment surface to be urged against the capillary alignment surface so as to align the multicore fiber cores relative to the alignment block body.

11 Claims, 9 Drawing Sheets

STRUCTURES AND TECHNIQUES FOR ALIGNING A MULTICORE FIBER IN A FERRULE OR PRODUCTION JIG

CROSS REFERENCE TO RELATED APPLICATIONS

The present application claims the priority benefit of U.S. Provisional Patent Application Ser. No. 61/733,531, filed on Dec. 5, 2012, which is owned by the assignee of the present invention, and which is incorporated herein by reference in its entirety.

INCORPORATION BY REFERENCE

The following patent application is incorporated herein by reference in its entirety:

"Multifiber Connectors for Multicore Optical Fiber Cables," U.S. patent application Ser. No. 13/049,794, filed on Mar. 16, 2011, which is owned by the assignee of the present application.

BACKGROUND OF THE INVENTION

1. Field of the Invention

The present invention relates generally to the field of fiber optics, and in particular to structures for providing aligned connectorization for multicore optical fibers.

2. Background Art

Multicore fiber (MCF) technology has the potential of greatly increasing the capacity of current optical fiber networks by allowing a plurality of optical data signals to be carried in parallel by a single fiber. MCFs have been developed that have a diameter that is equal to, or close to, that of a single-core fiber. The use of these MCFs in place of single-core fibers increases patching densities without jeopardizing optical performance or introducing fiber management issues.

One important technical issue to be addressed is connectorization, i.e., how to suitably terminate MCF cables such that they exhibit an acceptably low level of insertion loss. MCFs currently under development must have an insertion loss that is low enough to support data communication applications typically requiring 2 to 4 connections. Meeting insertion loss requirements has proven to be challenging with currently available technology.

SUMMARY OF THE INVENTION

An aspect of the invention is directed to an alignment block for aligning a multicore fiber. The alignment block has a body with a front face and a rear face, and includes a capillary extending between a front opening at the first face and a rear opening at the rear face. The capillary has an inner circumference that includes one or more alignment surfaces corresponding to one or more respective multicore fiber alignment surfaces. The front opening is shaped to fit closely around the multicore fiber so as to prevent non-longitudinal movement of the multicore fiber relative to the alignment block body. The rear opening is shaped to fit around the multicore fiber so as to allow a selected amount of non-longitudinal movement of the multicore fiber relative to the alignment block body. The capillary provides tapered transition between the rear opening and the front opening. Movement of the multicore fiber along the capillary causes the multicore fiber alignment surface to be urged against the capillary alignment surface so as to align the multicore fiber cores relative to the alignment block body.

DETAILED DESCRIPTION

Aspects of the invention are directed to structures and techniques for reducing insertion loss for multicore fibers (MCFs), and in particular to structures and techniques for providing precise and reliable rotational alignment for an MCF within a ferrule, production jig, or the like.

Practices of the invention are described herein with respect to an MCF having a D-shaped cross-sectional profile. Such an MCF is described in U.S. patent application Ser. No. 13/049,794, filed on Mar. 16, 2011, which is owned by the assignee of the present invention and which is incorporated by reference herein in its entirety. It will be appreciated that the practices of the invention described herein are applicable to MCFs having other types of profiles including, for example, double-D profiles, polygonal profiles, and the like.

Figure 1A:
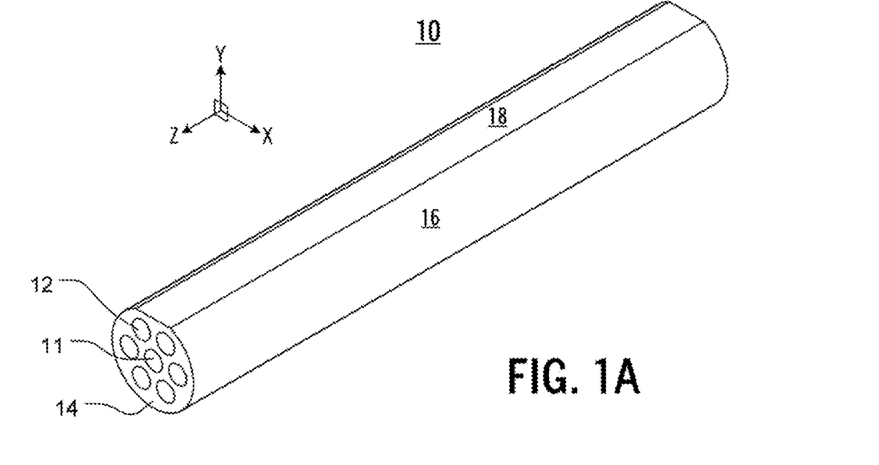
FIGS. 1A and 1B show an end view and an isometric view of a 7-core multicore fiber (MCF) with a D-shaped profile.
Figure 1B:
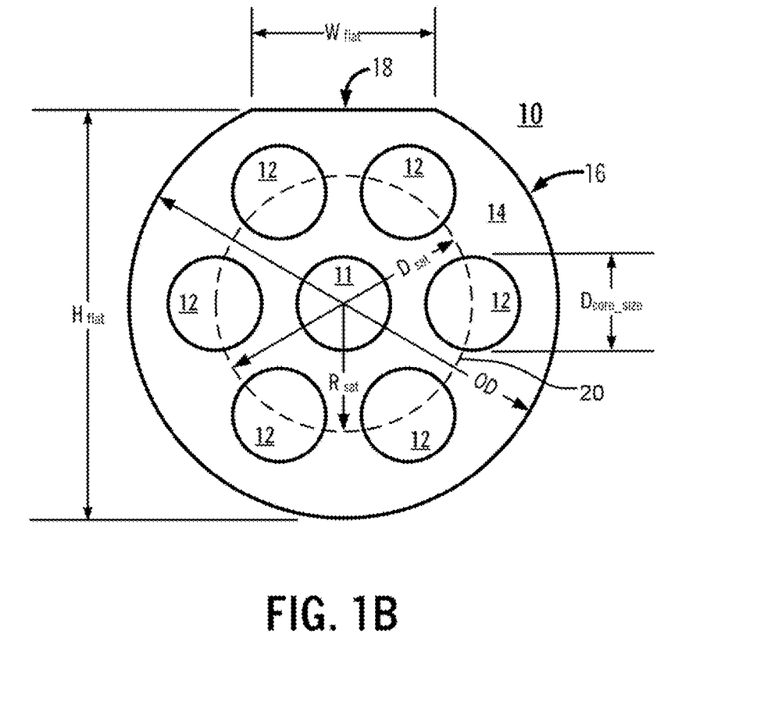

FIGS. 1A and 1B show, respectively, an end view and an isometric view of an exemplary D-shaped 7-core MCF 10. MCF 10 comprises a center core 11 and six satellite cores 12 extending through a shared cladding 14. The satellite cores 12 are arranged in a regular hexagonal configuration, with each neighboring pair of satellite cores forming a side of the hexagon, and with center core 11 located at the center of the hexagon. MCF 10 has an outer circumference including a cylindrical portion 16 and a flat side surface 18, respectively referred to herein as the "cylinder" and the "flat."

Center core 11 is located at the longitudinal axis of MCF cylinder 16. Flat 18 extends down the length of the fiber and is strategically located to precisely indicate the rotational orientation of the MCF satellite cores 12. In the depicted exemplary MCF 10, flat 18 is adjacent to a pair of satellite cores 12, and is parallel to an imaginary line connecting the centers of the two satellite cores.

FIG. 1B shows an endface view of MCF 10, and illustrated as number of dimensional parameters that are used herein to describe the invention. These parameters include the following:

OD: the outer diameter of the MCF cylinder 16;
$D_{sat}$: the diameter of an imaginary circle 20 passing through the centers of the six satellite cores 12;
$R_{sat}$: the radius of the satellite circle 20;
$W_{flat}$: the width of the MCF flat 18;
$D_{core\_size}$: the diameter of each of the cores 11, 12;
$H_{flat}$: the height of the MCF flat 18 (i.e., the distance between flat 18 and the opposite side of cylinder 16).

Exemplary MCF 10 has the following dimension (in micrometers):

OD: 125;
$D_{sat}$: 74.6;
$R_{sat}$: 37.3;
$W_{flat}$: 53.4;
$D_{core\_size}$: 27.2
$H_{flat}$: 119.

Further, for the purposes of the present discussion, the term "z-axis" refers to the longitudinal axis of the MCF cylinder 16. The terms "x-axis" and "y-axis" refer respectively to horizontal and vertical axes perpendicular to the z-axis. The term "longitudinal movement" refers to translational movement along the z-axis. The term "radial movement" refers to translational movement perpendicular to the z-axis (i.e., translational movement along the x- and/or y-axes). The term "polar" is used to describe rotational movement or alignment around the z-axis. The term "non-longitudinal movement" refers collectively to all movement of a fiber other than translational movement along the z-axis.

When matching first and second MCFs are connected to each other, individual cores of the first MCF are paired with respective individual cores of the second fiber. Ideally, each paired core should be perfectly aligned with its mate.

Theoretically speaking, if the first and second MCFs are perfectly matched, if their respective center cores are located exactly at the z-axis, and if the only misalignment between the two fibers is rotational misalignment around the z-axis, then there would be no offset between the center cores. As a practical matter, however, because of manufacturing variations and other phenomena, center cores are also affected by polar misalignment, although typically to a lesser degree than satellite cores.

Figure 2:
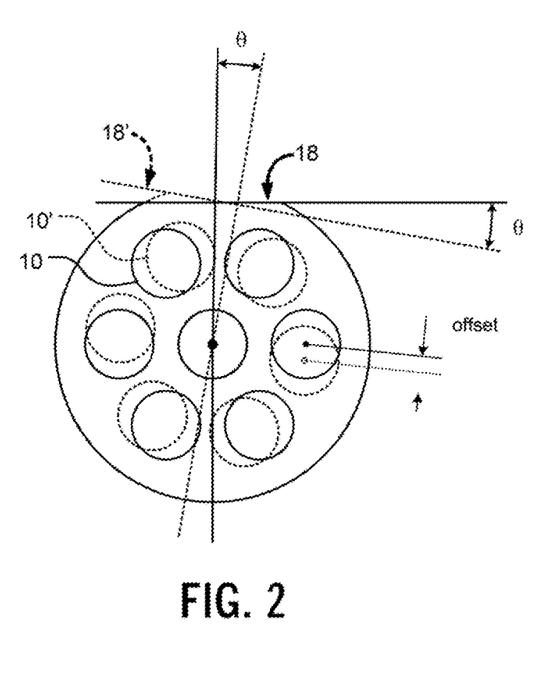
FIG. 2 is an end view of a first MCF onto which is superimposed a second MCF that has been rotated by an angle $\theta$.

FIG. 2 is a diagram of MCF 10 onto which has been superimposed a second MCF 10' (in broken lines). MCF 10 has a flat 18 that is perfectly horizontal. MCF 10' has been rotated in a clockwise direction, with a tilt angle of 8. Applying basic principles of geometry, it will be seen that the tilt angle θ is equal to the angle of the second MCF flat 18' relative to the first MCF flat 18. If the two MCFs are perfectly aligned, θ=0.

It will further be seen that the rotation of the second MCF relative to the first MCF results in an offset between the centers of corresponding satellite cores. If the diameter of the satellite circle is known, it is possible to exactly calculate the length of the offset resulting from a given tilt angle. Further, if the amount of offset is known, it is possible to predict the amount of resulting insertion loss, based upon the known properties of the MCF satellite cores.

Figure 3:
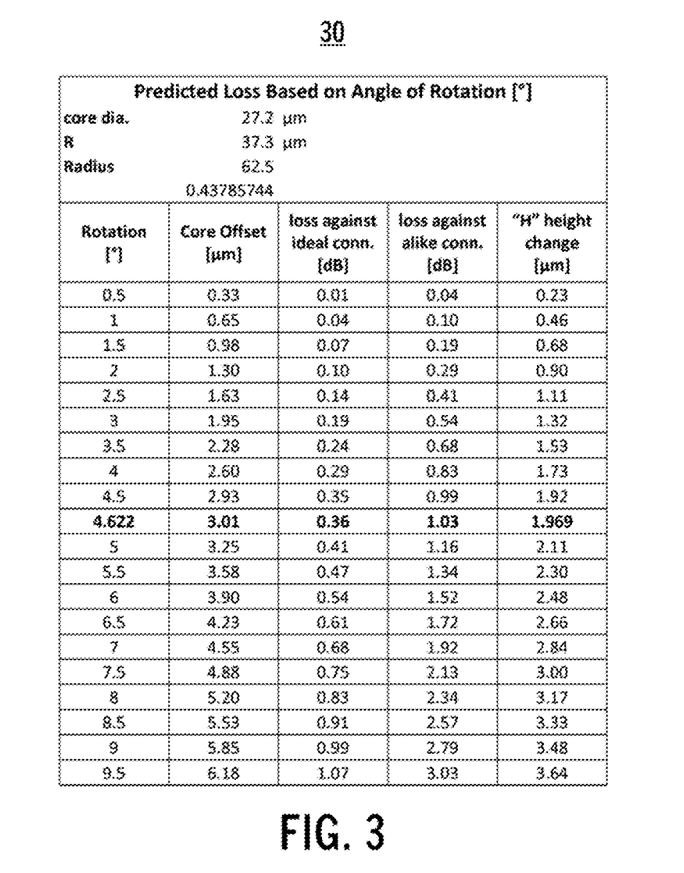
FIG. 3 shows a table setting forth the relationship between angle of rotation and insertion loss for a given fiber geometry.

FIG. 3 shows a table 30 setting forth predicted loss based on angle of rotation for MCF 10. As mentioned above, has a satellite circle with a diameter of 74.6 μm (and therefore a radius of 37.3 μm). From Table 30, it will be seen that in order to attain a predicted loss of 0.10 dB, it would be necessary to limit the maximum amount of rotation of a first MCF relative to a second MCF to no greater than 2 degrees.

Figure 4:
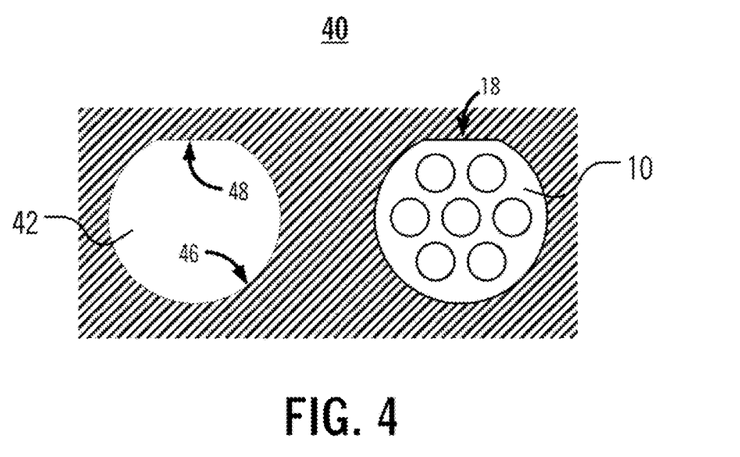
FIG. 4 is a diagram illustrating the rotational confinement of the MCF shown in FIGS. 1A and 1B by a closely fitting ferrule capillary.

FIG. 4 shows a diagram of a portion of a ferrule 40, or like structure, having a capillary 42 with a D-shaped profile corresponding to the shape of MCF 10. For the purposes of the present discussion, the ferrule portion 40 is provided with two identical capillaries 42. The left capillary 42 is empty; the right capillary contains an installed MCF 10.

It will be seen that the capillaries 42 have D-shaped profiles that are shaped to fit closely around MCF 10. In particular, each capillary includes a flat portion 48 corresponding to the MCF flat 18, and a round portion 46 corresponding to the MCF cylinder. Rotation of the MCF is constrained by capillary flat 48, which butts up against the MCF flat 18.

Figure 5:
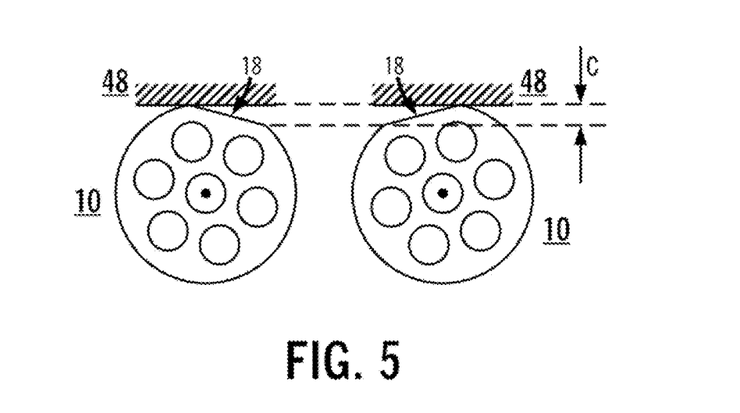
FIG. 5 is a diagram illustrating the relationship between fiber-capillary clearance and rotational confinement of the MCF by a closely fitting ferrule capillary.

As illustrated in FIG. 5, the rotational range of MCF 10 varies as a function of the amount of clearance C between the MCF flat 18 and the capillary flat 48. Because the dimensions of MCF 10 are known, it is possible to calculate exactly the amount of clearance required to obtain a given rotational range.

From table 30 (FIG. 3), it will be seen that in order to obtain a maximum insertion loss of 0.10 dB, it is necessary to restrict rotational misalignment to no greater than approximately 2 degrees. Thus, if a first MCF 10 is to be connected to a second MCF having a perfectly horizontal orientation, then it would be possible to achieve the desired loss level by using a ferrule capillary having a clearance of approximately 0.9 micrometers.

If on the other hand MCF 10 is to be connected to a second MCF having the same range of rotational freedom, then one must allow for the possibility that each of the MCFs could be tilted in opposite directions, thereby doubling the range of potential rotational misalignment. Thus, a clearance of 0.9 micrometers would result in as much as 4 degrees of rotational misalignment, with a maximum potential insertion loss of approximately 0.29 dB. In order to achieve the desired loss level of 0.10 dB, it would therefore be necessary to restrict the rotational movement of MCF 10 to ±1 degrees.

It is anticipated that in order to meet the insertion-loss requirements of MCF applications currently being developed, the respective centers of each pair of mated cores must have a maximum offset of approximately 0.65 micrometers. From table 30 (FIG. 3) it can be seen that an offset of 0.65 micrometers corresponds to a tile angle of 2 degrees. Thus, the rotational movement of MCF 10 must be restricted to a range of approximately ±1 degree. This rotational range corresponds to a clearance C of approximately 0.46 micrometers.

It has proven difficult to achieve the required tolerances using prior technology. For example, in one approach, polar alignment is provided for a D-shaped MCF by placing one or more of the MCFs into a fixture that aligns the centers of the fibers on the same axis and then pressing an ultra-flat alignment bar onto all of the respective MCF flats so as to cause each MCF to rotate into polar alignment. Once aligned, each MCF is fixed into position at a point several millimeters behind the fixture using epoxy encapsulation or other suitable means. The MCFs are then inserted into a round connector ferrule for cleaving and endface polishing.

To date, the loss performance achieved with the above process has been a mean insertion loss of approximately 1 dB, with a maximum insertion loss of approximately 2 dB. This loss level is two to three times greater that the loss permissible for structured cabling systems supporting data communications systems, such as 10 Gb, 40 Gb, 100 Gb, or 400 Gb Ethernet or Fibre Channel data links.

The present invention provides structures and techniques with significantly improved loss performance. The operation of the present invention is generally described with respect to an "alignment block," a term that is used herein to refer generically to ferrules, production jigs, and like structures for providing aligned connectorization for optical fibers.

Figure 6A:
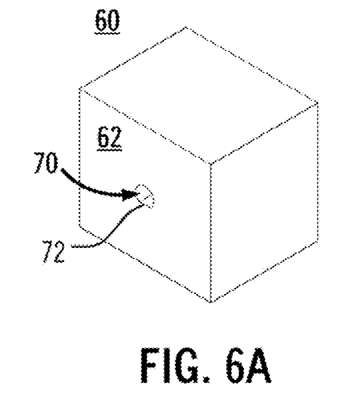
FIGS. 6A and 6B show, respectively, isometric and rear views of an alignment block according to an aspect of the invention.
Figure 6B:
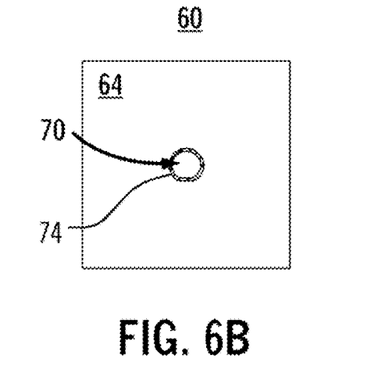

FIGS. 6A and 6B show, respectively, isometric and rear views of an exemplary alignment block 60, comprising a body having a front face 62, a rear face 64, and a capillary 70 extending therebetween. It will be appreciated that, as used herein, the terms "front" and "rear" are arbitrary. For the purposes of the present discussion, the term "rear face" is used to refer to the side of the alignment block into an MCF is loaded. The term "front face" refers to the side of the alignment block from which the lead end of the multicore fiber segment exits after traveling the length of the fiber capillary 70.

Capillary 70 has a front opening 72 at front alignment block face 62, and a rear opening 74 at rear alignment block face 74. MCF 10 is loaded into alignment block 60 by stripping an end portion of the fiber, inserting the stripped fiber into the rear opening 64, and sliding it down the length of capillary 70 until it emerges from the front opening 72.

The front capillary opening 72 fits around MCF 10 closely, so as to limit the rotational range of movement within the above-described tolerances, while allow MCF 10 to travel in a longitudinal direction through the opening 72. According to these tolerances, in order to achieve an insertion loss of 0.2 dB or better, the rotation of MCF 10 at the front opening 72 should be limited to approximately ±1.5 degrees. This rotational range corresponds to a clearance between the outer surface of MCF 10 and the inner surface capillary 70 of no greater than 0.68 micrometers.

According to the present invention, the rear capillary opening 74 is configured to have a relatively large bore relative to the outer diameter of MCF 10, thereby allowing relatively easy insertion of MCF 10 into the capillary 70. The relatively large bore of the rear opening is tapered between insertion point and the front opening 72, so as to cause MCF 10 to become oriented in its intended angular position. The described configuration may enable smaller fiber-to-ferrule tolerance, thereby reducing loss caused by lateral fiber misalignment.

Figure 7:
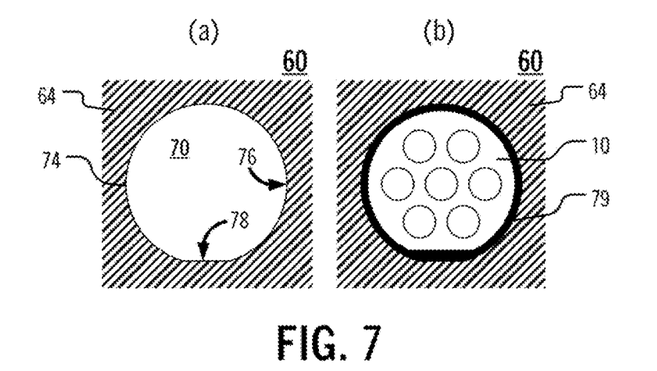
FIG. 7 is a diagram illustrating a loose-fitting rear capillary opening according to an aspect of the invention.
Figure 8:
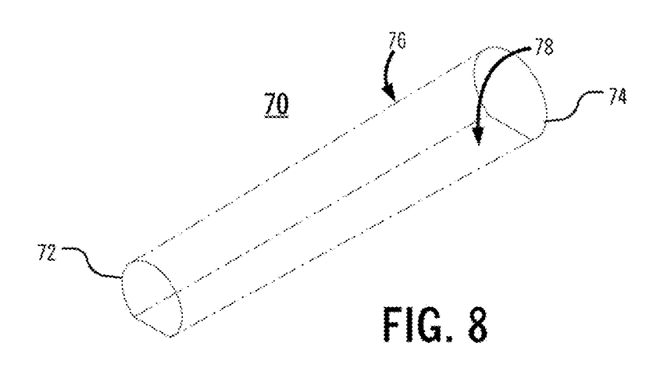
FIG. 8 is a diagram illustrating a capillary geometry incorporating a close-fitting front opening and the loose-fitting rear capillary opening shown in FIG. 7.

FIGS. 7 and 8 are a pair of diagrams illustrating a first approach according to the present invention for configuring the rear capillary opening.

FIG. 7(a) shows a cross section diagram of the capillary 70 at the rear face 62 of the alignment block 60, and FIG. 7(b) shows the capillary 70 after MCF 10 has been installed therein. In FIG. 7, a loose-fitting rear opening 74 is created by configuring the rear opening to have a D-shaped profile corresponding in shape to the front opening, but with a selected amount of clearance 79 (shown in black) between the MCF flat and the capillary alignment surface 78.

In the present example, the rear capillary opening is configured to provide the MCF 10 with a coarse angular orientation of approximately ±20 degrees. This coarse angular orientation can be achieved by configuring the rear opening 74 to have an outer diameter approximately 100 micrometers larger than that of the first opening.

FIG. 8 is a diagram illustrating an exemplary capillary geometry 70 for use with the rear capillary opening 74 shown in FIG. 7. It will be seen that the flat capillary alignment surface 78 extends between the flat portions of the front and rear capillary openings 72 and 74, and that the cylindrical portion of the capillary surface extends between the curved portions of the front and rear capillary opening.

Figure 9:
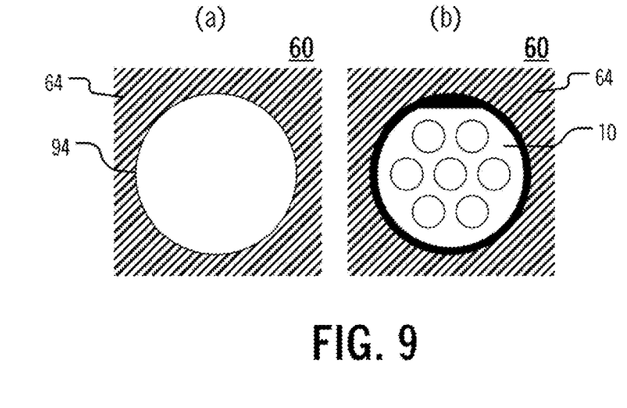
FIG. 9 is a diagram illustrating a loose-fitting rear capillary opening according to an aspect of the invention.

FIG. 9 is a diagram of a rear opening 94 according to a further aspect of the invention. Instead of a D-shaped profile, the rear opening 94 is configured to have a circular shape. In this exemplary practice of the invention, MCF 10 has a full range of rotational movement within the rear opening 94.

Figure 10:
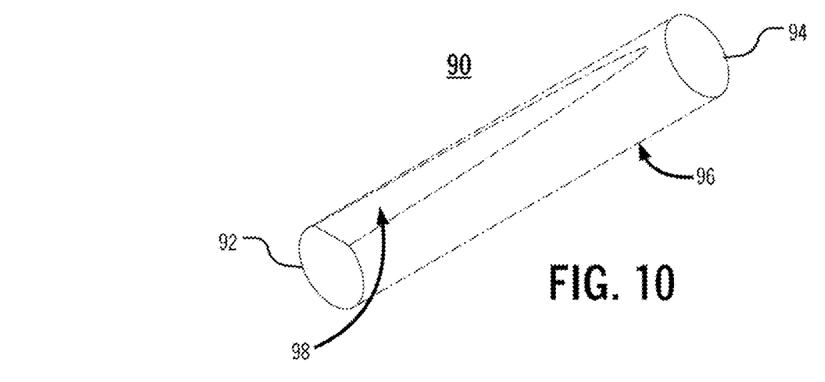
FIG. 10 is a diagram illustrating a capillary geometry incorporating a close-fitting front opening and the loose-fitting rear capillary opening shown in FIG. 9.

FIG. 10 is a diagram illustrating an exemplary capillary geometry 90 for use with the rear capillary opening 94 shown in FIG. 9. Because of the circular shape of the rear opening 94, the capillary alignment surface 98 merges with the cylindrical portion of the capillary surface 96 at some point along the length of the capillary 90. Again, a smooth tapered transition is provided between the rear opening 94 and the front opening 92.

It is noted that Design 1 (FIGS. 7-8) and Design 2 (FIGS. 9-10) are based on the sample principle. Design 2 exhibits greater tolerance for the angular position of the MCF at the insertion point. However, Design 2 may exhibit jamming of MCF 10 in the capillary if the angular position of the MCF at the insertion point exceeds tolerance.

Figure 11:
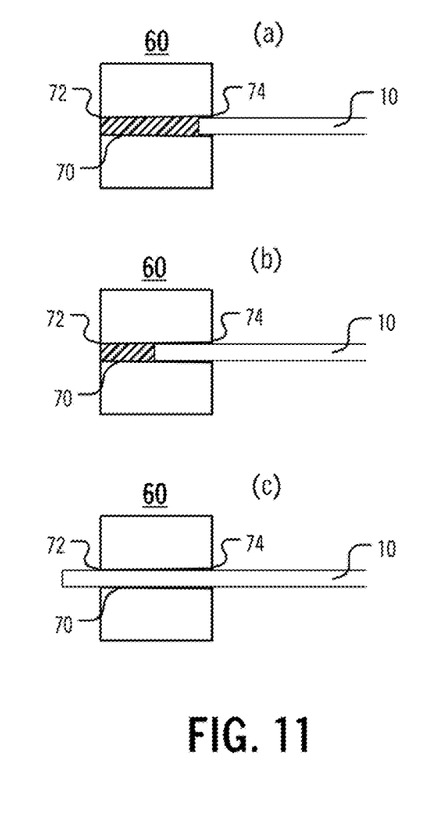
FIG. 11 shows a series of diagrams illustrating the progress of a fiber through an exemplary capillary in an alignment block according to the invention.

FIG. 11 is a cross section diagram illustrating the loading of MCF 10 into the alignment block 60 through capillary 70. In FIG. 11(a), the lead end of MCF 10 is inserted into the loose-fitting rear capillary opening 74. In FIG. 10(b), MCF 10 is approximately halfway down the capillary. Finally, in FIG. 10(c), the end of MCF 10 exits the alignment block through the close-fitting front capillary opening 72.

It will be seen that as MCF 10 travels down the length of the capillary 70, the fit of the capillary around MCF 10 becomes increasingly close. Thus, the range of non-longitudinal movement of MCF 10 becomes increasingly confined. When MCF 10 reaches the front capillary opening 72, it reaches maximum confinement, and its cores are now rotationally aligned.

Both Design 1 (FIGS. 7 and 8) and Design 2 (FIGS. 9 and 10) are capable of reducing MM-MCF connection loss by 0.5 dB or more, compared with earlier designs, to help such fibers meet specifications for use in data center or enterprise structured cabling systems. Design 1 or Design 2 could be applied to one or both of the following: as a ferrule bore design for MPO/MTP or other multifiber connectors; as a guide to angularly align fibers prior to inserting them into either a round-bore ferrule or a ferrule of Design 1 or Design 2.

Figure 12:
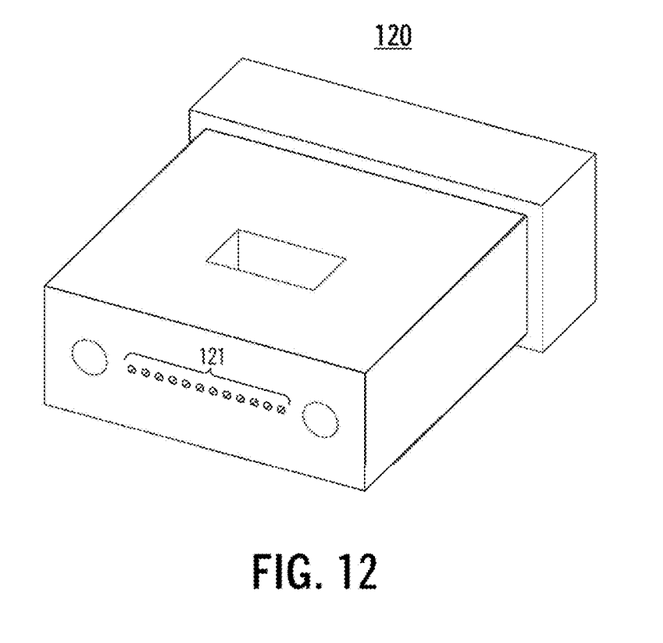
FIGS. 12 and 13 are a pair of diagrams illustrating a multifiber ferrule and an alignment guide according to further aspects of the invention.

FIG. 12 shows a perspective view of an exemplary MT-type multifiber ferrule 120 comprising a 1×12 array of capillaries 121 in accordance with the invention.

Figure 13:
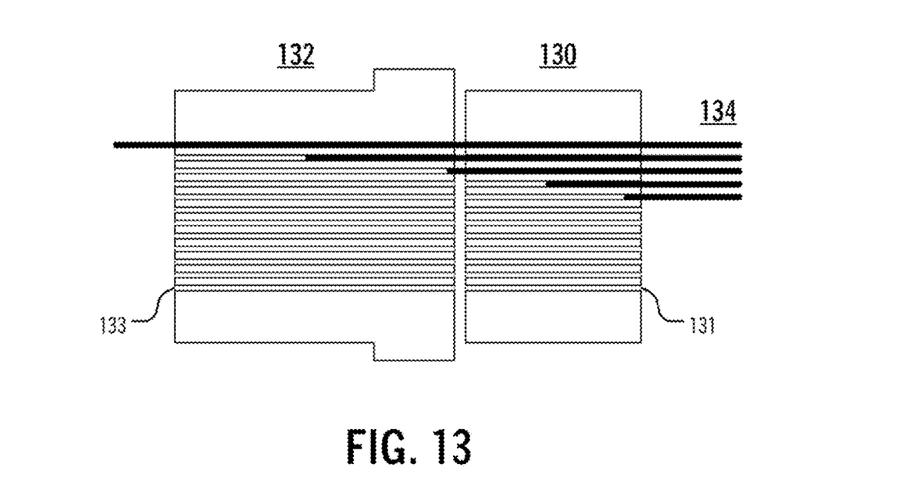

FIG. 13 shows a cross section diagram of a portion of an alignment guide 130 comprising a 1×12 array of capillaries 131 for use in conjunction with a suitable multifiber ferrule 132. The alignment guide capillaries 131 are configured to line up with the ferrule capillaries 133 to allow fibers 134 to be threaded first through the guide 130 and then through the ferrule 132. As mentioned above, the alignment guide 130 can be used in conjunction with a ferrule 132 containing an alignment feature, such as the ferrule shown in FIG. 11. Alternatively, the alignment jig can be used in conjunction with a round-bore ferrule that does not provide an alignment feature. The alignment jig may be incorporated into the MPO/MT type of ferrule or may constitute a standalone component.

Testing

Figure 14:
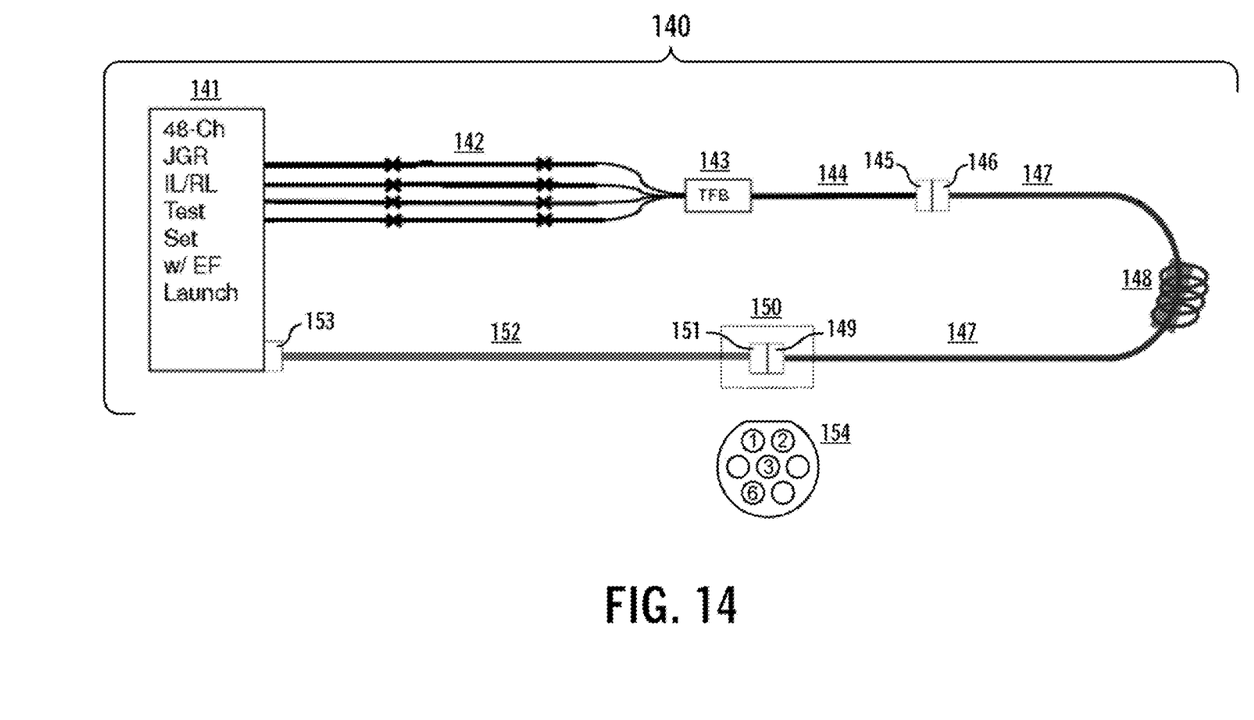
FIG. 14 shows a testing setup used to measure the relationship between misalignment and insertion loss.

FIG. 14 shows a diagram of the setup 140 that was used to test a set of MCF-to-MCF connections 150 between a launch cable 147 and a set of test fibers 152. The testing instrument was a 48-channel JGR IL/RL test set 141 with an encircled flux (EF) launch, which functioned both an input generator and as an output detector.

A number of tests were conducted in order to measure the relationship between rotational misalignment and insertion loss for connections between matching segments of MCF of the type illustrated in FIGS. 1A and 1B. An input light was launched into a series of test MCF-to-MCF connections 150 having varying degrees of rotational misalignment. The resulting output was compared against the input in order to determine the amount of connection loss.

The launch cable 147 comprised four MCF segments that were terminated with MT4 ferrules 146 and 149. The test MCF segments were connectorized in sets of four with MT4 ferrules 151 and 153. Ferrule 146 was used to connect the launch cable 147 to an optical input, as described below. Ferrule 153 was used to connect the test fiber set 152 to the testing instrument 141. The launch cable 147 was wound around a 15 mm mandrel 148 in order to provide mode conditioning.

Ferrules 149 and 151 were connected together to form the test connections 150 between the launch cable 147 and the test fiber set 152. The launch cable MCFs were terminated at ferrule 149 with the MCF flats precisely aligned against a reference axis. The test fibers 152 were terminated at ferrules 151 and 153 with varying rotational orientations.

For each of the four MCFs in launch cable 147, input light from the testing instrument 141 was fed through a series of tapered single-core fibers 142 and then coupled together by means of a tapered fiber bundle 143 into a 27.2 micrometer MCF 144. The input MCFs 144 were connectorized with an MT4 ferrule 145, which was connected to ferrule 146 in order to provide a connection between the input MCFs 144 and the MCF segments contained in launch cable 147.

Sample MCF-to-MCF connections 150 were obtained by connecting launch cable 147 to a series of test fiber sets 152. As illustrated on MCF cross section 154, insertion loss was measured for satellite channels 1, 2, and 6, and for central channel 3 of each sample MCF-to-MCF connection. Each test set of fibers was tested twice: once with ferrules 151 and 153 connected respectively to launch cable 147 and testing instrument 141, and once with the connections reversed.

Figure 15:
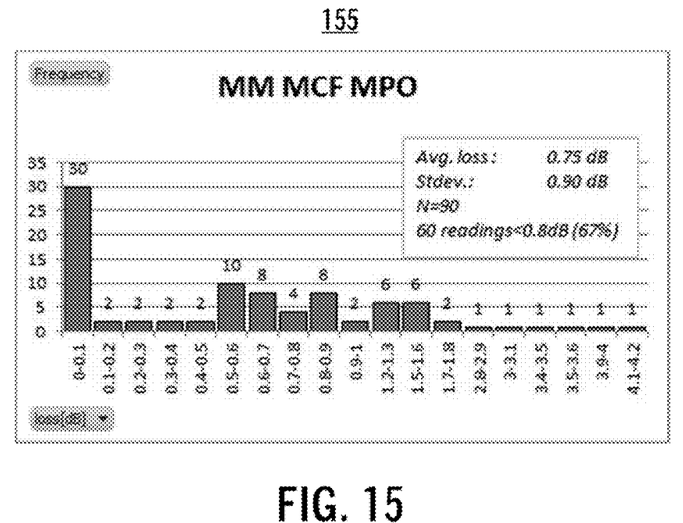
FIG. 15 is a histogram illustrating the frequencies of loss incidences at various loss ranges for the tested MCF-to-MCF connections tested using the FIG. 14 setup.

FIG. 15 shows a frequency histogram 155 of loss incidences at various levels for all of the testing MCF-to-MCF connections @ 850 nm and 1310 nm.

Figure 16:
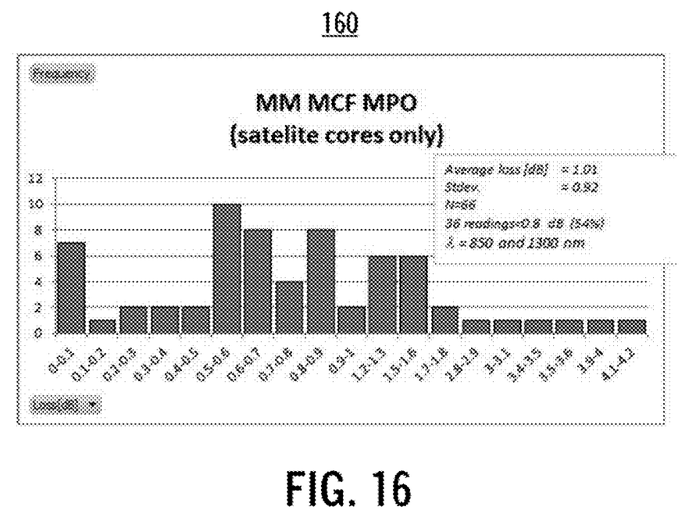
FIG. 16 is a histogram illustrating the frequencies of loss incidences for the satellite cores only.

FIG. 16 shows a frequency histogram 160 of loss incidences for the satellite cores only.

Figure 17:
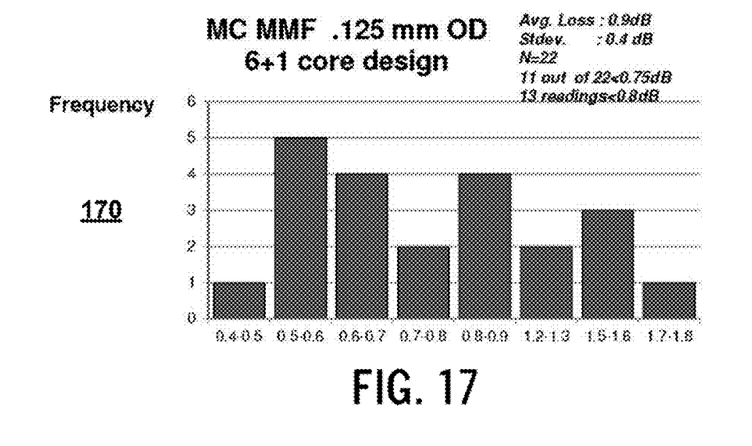
FIG. 17 shows a histogram for a selected one of the sets of test MCFs.

FIG. 17 shows a histogram 170 for the second end of the test fibers, satellite cores only.

Figure 18:
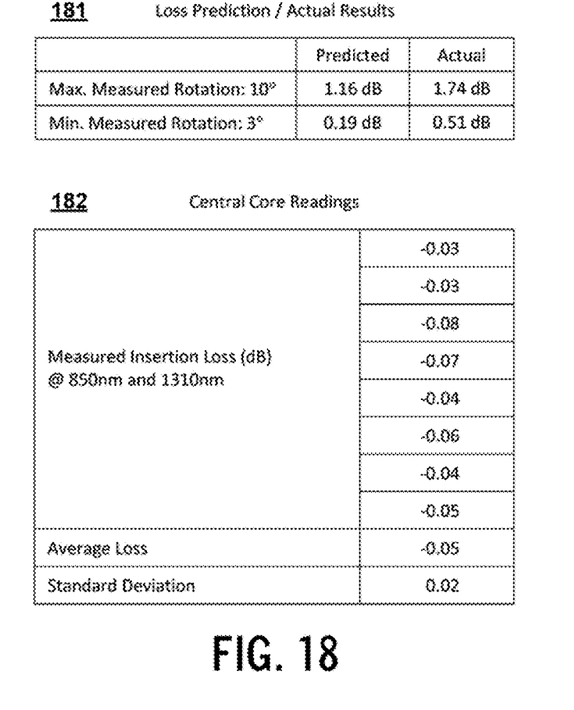
FIG. 18 shows a pair of tables setting forth the divergence between predicted and measured loss for the test MCFs, and the central core readings for the selected on of the sets of test MCFs.

FIG. 18 shows a pair of tables 181, 182 setting forth data with respect to the same set of test fibers. Table 181 sets forth the divergence between loss prediction and actual results. Table 182 sets forth the central core readings. Light-to-core confinement was also examined. There did not appear to be significant mode leaking to adjacent channels. (The fiber was not intentionally bent or straightened.)

With respect to table 181, it is noted that the difference between predicted loss and measured loss is due to not taking into account a number of loss contributors, including, for example: (1) ferrule hole true position tolerance; (2) guide pin to guide hole fit; (3) fiber to fiber hole fit; (4) core/cladding eccentricity; and (5) true position tolerance of cores. Based upon the results of the described tests, it is believed that the contribution of rotational misalignment to insertion is significantly greater than other factors.

Test Conclusions

The following conclusions were drawn from the above-described tests.

1. The main contribution to insertion loss between MCFs is rotational misalignment of the cores at the endface-to-endface connection.

2. Inability to retain the desired fiber position and randomness of fiber-assumed positions in the ferrule represents the main obstacle to overcome. One of the culprits may be the inability of the epoxy to lock the jig-induced fiber position, once the fiber is removed from the aligning/curing jig.

3. Other sources of the cores misalignment appear at this moment to be less significant and will be dealt with later. These other sources include: true position of the cores and flat, cores out of roundness, fiber diameter tolerance, etc.

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. An alignment block for rotationally aligning a multicore fiber installed therein, comprising:
   a body having a front face and a rear face,
   wherein the body includes a capillary extending between a front opening at the front face and a rear opening at the rear face,
   wherein the capillary has an inner circumference that includes an alignment surface corresponding to an alignment surface on a multicore fiber,
   wherein the front opening is shaped to fit closely around the multicore fiber, such that when the multicore fiber is positioned within the front opening, it is held in an aligned orientation with a range of rotational movement falling within a selected tolerance,
   wherein the rear opening is shaped to fit around the multicore fiber so as to allow a selected amount of non-longitudinal movement of the multicore fiber within the rear opening, and
   wherein the capillary provides a tapered transition between the rear opening and the front opening, such that as the multicore fiber travels down the length of the capillary, the fit of the capillary around the multicore fiber becomes increasingly close, and such that the range of non-longitudinal movement of the multicore fiber becomes increasingly confined until it reaches maximum confinement at the front opening,
   whereby movement of the multicore fiber from the rear opening to the front opening causes the multicore fiber alignment surface to be urged against the capillary alignment surface so as to rotationally align the multicore fiber.

2. The alignment block of claim 1,
   wherein the rotational range of the multicore fiber within the front opening limits the amount of offset between the cores of the multicore fiber and the cores of a second, like multicore fiber.

3. The alignment block of claim 1,
wherein the multicore fiber has a D-shaped profile comprising a flat side alignment surface, and
wherein the capillary has an inner circumference including a flat surface corresponding to the flat side alignment surface of the multicore fiber.

4. The alignment block of claim 3,
wherein the rear opening has a D-shaped profile, so as to provide a coarse rotational alignment of the multicore fiber when it is inserted into the rear opening.

5. The alignment block of claim 3,
wherein the rear opening has a circular profile.

6. The alignment block of claim 1, configured as a ferrule.

7. The alignment block of claim 6, configured as a multi-fiber ferrule.

8. The alignment block of claim 1, configured as an alignment guide for use in conjunction with a ferrule.

9. The alignment block of claim 8, wherein the alignment block is configured as an alignment guide through which one or more multicore fibers are threaded before being installed into a ferrule.

10. The alignment block of claim 9, wherein the alignment block is configured as an alignment guide for use with a round-bore ferrule.

11. The alignment block of claim 9, wherein the alignment block is configured as an alignment guide for use with a ferrule containing an alignment feature.

* * * * *